Jan. 18, 1966 F. ZUMBO 3,229,952
CHAIN TIE DOWN DEVICE WITH SCREW ADJUSTMENT MEANS
Filed June 12, 1964
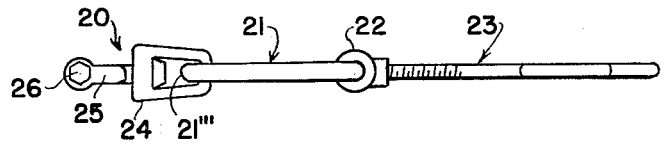
FIG. 2
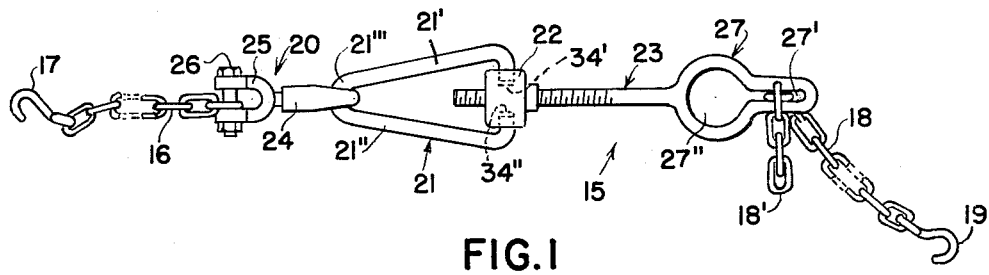
FIG. 1
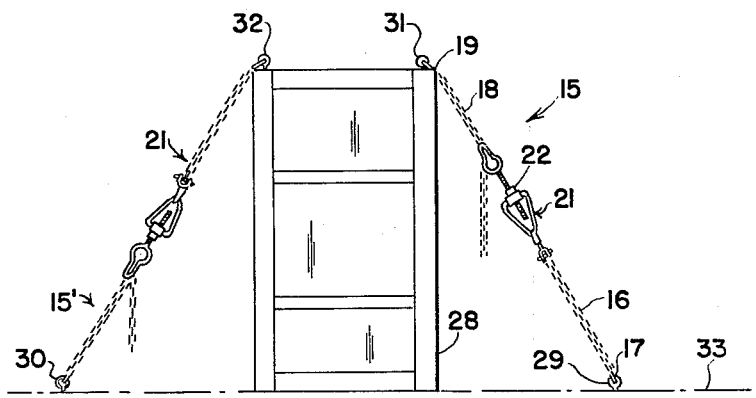
FIG. 3
INVENTOR,
Frank Zumbo,
BY 
ATTORNEY

United States Patent Office 3,229,952
Patented Jan. 18, 1966

3,229,952
CHAIN TIE DOWN DEVICE WITH SCREW
ADJUSTMENT MEANS
Frank Zumbo, 1938 E. 1st St., Brooklyn, N.Y.
Filed June 12, 1964, Ser. No. 374,710
9 Claims. (Cl. 248—361)

The present invention relates to lashes for releasably securing automobiles, cases of merchandise, crates of equipment or other masses to a deck, pier or the floor on which they rest and more particularly to tie down devices including means to stress them in tension after their ends are anchored. This type of device comprises a tightening device intermediate two chains whose remote ends terminate in a hook respectively.

An object of this invention is to provide a novel and improved lashing device of the character described, which is easily manually manipulatable without any tools to provide a quick tie down which is releasable.

Another object thereof is to provide a novel and improved quick tie down device of the kind set forth, which affords easy adjustment of chain length so the tie is made nearly taut and then by a further manipulation, the tie is stressed in tension.

A further object there is to provide a novel and improved quick lash of the nature described, which is simple in construction, reasonable in cost, easy to mount and detach and which is efficient in carrying out the purposes for which it is designed.

Other objects and advantages will become apparent as this disclosure proceeds.

For one practice of this invention, the leash device comprises two lengths of chain, a comparatively large bail, nut and screw and two hooks. One end of one chain is releasably engageable in the eye which is at one end of said screw. One end of the other chain is swively connected to a pronounced central bight in said bail. The hooks are carried, one on the other end of each of the chains. The distal ends of the bail are bent inward and in alignment. The nut is carried by these bent in bail ends and may be in swivelled relation therewith. The threaded end of the screw is engaged in said nut. Said chain-engaging end of the screw is away from the bail. If the bail is in fixed relation to said nut, the screw and bail are coplanar. When the hooks are anchored to fixed eyes and the lash tensed by turning the bail, the screw and the bail are coplanar when the lash is stressed in tension, if the construction is one in which the bail is swivelled on the nut.

In the accompanying drawing forming part of this specification, similar characters of reference indicate corresponding parts in all the views.

FIG. 1 is a pictorial view of a lashing device embodying the teachings of this invention.

FIG. 2 is a top plan view of a portion of FIG. 1; the chains and their hooks being omitted.

FIG. 3 shows an elevational view of a case of merchandise tied down to a floor by lashing devices of the type illustrated in FIG. 1.

In the drawing, the numeral 15 designates generally a lashing device of preferred construction. It consists of a chain 16 having a hook 17 at one end, another chain 18 also having a hook 19 at one end, a swivel means indicated generally by the numeral 20, a bail denoted generally by the numeral 21 having aligned inturned distal ends in engagement with a nut member 22 and a screw designated generally by the numeral 23, threadedly engaged in said nut. Said bail, nut and screw are rather large as compared to one of the chain links. The bail 21 should be large enough to allow a one hand grip on each of its rungs 21', 22" respectively to turn the nut 22. The bail is preferably of triangular shape to present a central bight 21''' which carries the link 24 of the swivel means 20. The clevis 25 of the swivel means is swivelled to the link 24 and by means of the bolt 26 through its tines, is connected to the other end of the chain 16. The screw 23 extends from the nut member 22 in a direction away from the bail 21 and terminates in an enlarged eye 27 having a keyhole shaped opening, the narrower part 27' of which is farthest away from the threaded end of the screw. The wider part 27" of said key-hole opening is a few times the size of a chain link so the end 18' of the chain 18 can be freely admitted therethrough. The narrower part of said opening is of a width slightly more than the thickness of a chain link. Hence when an intermediate link of the chain 18 is entered into the narrower opening 27', its adjacent links will have the eye 27 between them and thus lock the chain 18 to said eye 27. All links are identical. Alternate links are in a first general plane and the remainder are in a general plane perpendicular to said first plane.

One manner of tying down a crate or case 28 to the floor 33 on which it stands, is to use two identical lash devices 15, 15' as shown in FIG. 3. Eyes 29 and 30 are screwed into the floor at each side of the case and eyes 31 and 32 are screwed into the top cover of the case 28. The hooks 17 and 19 are set to engage the eyes 29 and 31 respectively. The free end of the chain 18 is set into the larger part 27' of the opening in the eye 27, pulled tight and then a chain link near the narrower part 27" of said opening, is slid thereinto. Now, the bail 21 is taken hold of with both hands and turned to tighten the lash. The lash 15' is mounted in similar manner to the eyes 30, 32 and tightened. Or, the tightening of both lashes 15, 15' can wait to be done by turning their bails, after both lashes are mounted. In many instances, the masses to be tied down offer some part to which the hook 19 can be anchored. For instance, an automobile offers its bumpers, a crate, one of its ties or some part of its contents to which a hook can be attached.

It is preferred that the bail 21 shall be swivelled to the nut member 22 by having the inturned ends of the bail rotatable in suitable sockets 34, 34' into which they fit in the nut member. This allows the lash 15 to be folded when not in use, so it is compact to carry and store. A suggested length for the bail 21 is between seven to nine inches and the rod stock out of which the bail and the screw are formed, is of a diameter between ⅜ to ½ inch. The screw 23, complete with its eye 27 may be a single casting as shown in FIG. 1. The nut 22 may be cast as a block and then its threaded hole provided, or such nut may be machined from bar stock.

This invention is capable of numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific description herein to indicate the scope of this invention.

I claim:

1. In an article of the character described, the combination of a screw having a threaded portion at one end and an eye at another end thereof whose opening is the shape of a keyhole; the narrower portion of said key-hole opening being farthest away from the threaded end of said screw, a bail, a ring carried on said bail, a member having a threaded hole therethrough serving as a nut threadedly engaged on said screw; the distal ends of said bail being carried on said nut whereby the general plane of said bail is coplanar with said screw; said nut being intermediate said eye and the central portion of said bail and an element to hold the end of a chain, swivelled to said ring on the bail.

2. An article as defined in claim 1, wherein said bail is swingably mounted on said nut.

3. An article as defined in claim 1, wherein said bail is elongated.

4. An article as defined in claim 1, wherein said bail is of a size that it can be grasped by all the fingers of both hands of a person at one time.

5. An article as defined in claim 1, including a first chain having an anchorage means at one end thereof; the other end of said first chain being linked to said element swivelled to said ring; and a second chain having an anchorage means at one end thereof; an intermediate link of the second chain being through the narrower portion of the keyhole opening in the eye of the screw; said narrower portion of said opening being of a width at least equal and very near to the thickness of said chain link; the links of at least a section of said second chain including said chain link being identical; alternate links of said section being in one general plane; the other links of said section being in another general plane and said planes being in angular relation.

6. An article as defined in claim 5, wherein said anchorage means are hooks respectively.

7. An article as defined in claim 5, wherein said bail is swingably mounted on said nut.

8. An article as defined in claim 5, wherein said bail is elongated.

9. An article as defined in claim 5 wherein said bail is of a sizle that it can be grasped by all the fingers of both hands of a person at one time.

References Cited by the Examiner

UNITED STATES PATENTS

| | | | |
|---|---|---|---|
| 278,474 | 5/1883 | Wartenberg | 287—61 X |
| 1,393,614 | 10/1921 | Ferragamo | 287—61 |
| 2,353,017 | 7/1944 | Denton | 248—361 |
| 2,822,144 | 2/1958 | Jones | 248—361 |

WILLIAM FELDMAN, *Primary Examiner.*